(12) United States Patent
Srivastava et al.

(10) Patent No.: US 7,368,719 B2
(45) Date of Patent: May 6, 2008

(54) SCINTILLATING MATERIALS, ARTICLES EMPLOYING THE SAME, AND METHODS FOR THEIR USE

(75) Inventors: Alok Mani Srivastava, Niskayuna, NY (US); Steven Jude Duclos, Clifton Park, NY (US); Holly Ann Comanzo, Niskayuna, NY (US); Sergio Paulo Martins Loureiro, Saratoga Springs, NY (US)

(73) Assignee: GE Homeland Protection, Inc., Newark, CA (US)

( * ) Notice: Subject to any disclaimer, the term of this patent is extended or adjusted under 35 U.S.C. 154(b) by 36 days.

(21) Appl. No.: 11/427,191

(22) Filed: Jun. 28, 2006

(65) Prior Publication Data

US 2008/0001086 A1    Jan. 3, 2008

(51) Int. Cl.
*G01T 1/20* (2006.01)
(52) U.S. Cl. .................................. 250/361 R
(58) Field of Classification Search ............ 250/361 R, 250/362, 367; 252/301.4 H, 700
See application file for complete search history.

(56) References Cited

U.S. PATENT DOCUMENTS

| | | | |
|---|---|---|---|
| 5,134,293 | A | 7/1992 | Anderson et al. |
| 5,213,712 | A | 5/1993 | Dole |
| 5,869,836 | A | 2/1999 | Linden et al. |
| 5,882,547 | A | 3/1999 | Lynch et al. |
| 6,093,347 | A | 7/2000 | Lynch et al. |
| 6,228,286 | B1 * | 5/2001 | Leblans et al. ...... 252/301.4 H |
| 6,437,336 | B1 | 8/2002 | Pauwels et al. |
| 6,585,913 | B2 | 7/2003 | Lyons et al. |
| 6,624,420 | B1 | 9/2003 | Chai et al. |
| 6,624,422 | B2 | 9/2003 | Williams et al. |
| 2005/0082484 | A1 | 4/2005 | Srivastava et al. |
| 2007/0029493 | A1* | 2/2007 | Kniss et al. ........... 250/370.11 |
| 2007/0131874 | A1* | 6/2007 | Srivastava et al. ....... 250/458.1 |

FOREIGN PATENT DOCUMENTS

EP         685548 A1 * 12/1995

OTHER PUBLICATIONS van Eijk C.W.E., de Haas J.T.M., Dorenbos P., Kramer K.W., Gudel H.U., Development of Elpasolite and Monoclinic Thermal Neutron Scintillators, Oct. 23-29, 2005, 2005 IEEE Nuclear Science Symposium Conference Record, vol. 1, pp. 239-243.*

(Continued)

*Primary Examiner*—David Porta
*Assistant Examiner*—David S Baker
(74) *Attorney, Agent, or Firm*—William E. Powell, III; Curtis B. Brueske

(57) ABSTRACT

Disclosed herein are scintillating materials, methods for their manufacture, and method for their use. In one embodiment, a scintillator comprises the formula $A_2LnBX_6$, wherein A comprises thallium (Tl), a Group IA element, and combinations comprising at least one of the foregoing, Ln comprises cerium, B comprises a Group IA element, and X comprises iodine (I) or an iodine compound, wherein the iodine compound comprises iodine (I) and an element selected from the group consisting of fluoride (F), chloride (Cl), bromide (Br), and combinations comprising at least one of the foregoing. Also disclosed are radiation detectors and methods for their use.

20 Claims, 3 Drawing Sheets

OTHER PUBLICATIONS

Bessiere A., Dorenbos P., van Eijk C.W.E., Kramer K.W., Grudel H.U., Galtayries A., Scintillation and Anomalous Emission in Elpasolite Cs2LiLuCl6:Ce3+, Jul. 1, 2005, Journal of Luminescence, vol. 117, pp. 187-198.*

Deren P.J., Strek W., Zych E., Drozdzynski J.; Up-Conversion in Elpasolite Crystals Doped with U3+; 2000; Chemical Physics Letters; vol. 332; pp. 308-312.*

Shah, Kanai S., et al.; Planar APD Arrays for High Resolution PET; Abstract; www.rmdinc.com/oldsite/papers/SPIEDENVERAPDa.pdf.

Visser, Gerard, et al., Development of low power high speed readout electronics for high resolution PET with LSO and APD arrays; www.NOVARAD.com/pages/documents/IEEE_Low_Power2001.pdf.

* cited by examiner

SCINTILLATING MATERIALS, ARTICLES EMPLOYING THE SAME, AND METHODS FOR THEIR USE

STATEMENT OF FEDERALLY FUNDED RESEARCH

This invention was made with support from the United States Government under contract number N66001-05-D6012, which was awarded by the Department of Homeland Security. The Government has certain rights in the invention.

TECHNICAL FIELD

This disclosure generally relates to scintillating materials.

BACKGROUND

Scintillating materials can be described as materials that fluoresce when in the presence of high energy electromagnetic radiation (e.g., gamma, X-ray, and so forth). The mechanism in which these materials are able to achieve this phenomenon is attributed to their ability to absorb electromagnetic radiation having a wavelength greater than that of the visible spectrum and releasing the energy with a wavelength that is within the visible spectrum. This property, which can be referred to as a Stokes-Shifting, is indicative of scintillators such as bismuth germinate (BGO), thallium doped sodium iodide (NaI:Th), and cerium-doped yttrium aluminum garnet (Ce:YAG).

The performance of scintillating materials, or scintillators, is generally measured via their efficiency, decay time, stopping power, and energy resolution. To be more specific, efficiency is described as the scintillator's overall ability to convert high-energy radiation (e.g., gamma radiation) into visible light. Efficiency is measured in light output (LO), which is sometimes referred to as light yield (LY), or even scintillation output, having the units of photons per megaelectronvolts (Photons/MeV). Decay time is the amount of time over which a scintillator releases stored energy as visible light, which is also referred to as the response of the scintillator. The decay time of scintillators can vary from nanoseconds to microseconds. Generally, it is desirable that the decay time is rapid (e.g., normally expressed in nanoseconds).

In gamma ray spectroscopy, the energy resolution of a scintillator is defined as its ability to discriminate between gamma rays with slightly different energies. The energy resolution is defined as the Full Width at Half Maxima (FWHM) of the photopeak at a given energy.

Depending upon these properties, specific scintillators can be employed in a variety of applications, such as in radioisotope imaging devices, radiation detectors (e.g., gamma detectors, X-ray detectors, and so forth), positron emission tomography equipment, and so on. However, commercial scintillators such as BGO, (NaI:Tl) and (Ce:YAG) exhibit several notable shortcomings in such applications. For example, BGO and Ce:YAG scintillators exhibit poor light output (e.g., about 9,000 photons/MeV) and energy resolution when irradiated with gamma rays. Therefore these materials are not preferred in equipment and devices that operate with respect to gamma radiation. For this reason, many such devices employ NaI:Tl scintillators, which exhibit greater energy resolution (e.g., about 7% greater) than the BGO and Ce:YAG scintillators, but provide less than desirable energy resolution. In another example, it has been found that BGO exhibits generally slower decay times than NaI:Tl and Ce:YAG scintillators in applications such as computed tomography (CT) scanners. Yet even further, it has been found that due to the relatively low atomic number of Ce:YAG, this scintillator's stopping power is less than desired. As a result, larger crystals are required for applications that employ this material, which can result in higher cost and size.

Due to these shortcomings, as well as others, there remains an unmet need in the art for scintillators having enhanced light output and energy resolution from gamma ray irradiation.

BRIEF SUMMARY

Disclosed herein are scintillating materials, methods for their manufacture, and methods for their use.

In one embodiment, a scintillator comprises the formula $A_2LnBX_6$, wherein A comprises thallium (Tl), a Group IA element, and combinations comprising at least one of the foregoing, Ln comprises cerium, B comprises a Group IA element, and X comprises iodine (I) or an iodine compound, wherein the iodine compound comprises iodine (I) and an element selected from the group consisting of fluoride (F), chloride (Cl), bromide (Br), and combinations comprising at least one of the foregoing.

In another embodiment a scintillator is disclosed. The scintillator comprises the formula $A_2LnBX_6$, wherein A comprises Tl, a Group IA element, and combinations comprising at least one of the foregoing, Ln is Ce, B comprises a Group IA element, and combinations comprising at least one of the foregoing, and wherein the B is different than the A, and X comprises I.

In another embodiment, a radiation detector is disclosed. The radiation detector comprises a crystal scintillator having the formula $A_2LnBX_6$, wherein, A comprises thallium (Tl), a Group IA element, and combinations comprising at least one of the foregoing, Ln comprises cerium, B comprises a Group IA element, X comprises iodine (I) or an iodine compound, wherein the iodine compound comprises iodine (I) and an element selected from the group consisting of fluoride (F), chloride (Cl), bromide (Br), and combinations comprising at least one of the foregoing, and a photodetector connected in operational communication to the crystal scintillator, wherein the photodetector is capable of producing an electrical signal upon scintillation of the scintillator.

In yet another embodiment, a method for detecting radiation with a radiation detector is disclosed. The method comprises disposing a scintillator crystal having the structure formula $A_2LnBX_6$ to a radiation source causing the scintillator crystal to emit photons, wherein, A comprises thallium (Tl), a Group IA element, and combinations comprising at least one of the foregoing, Ln comprises cerium, B comprises a Group IA element, X comprises iodine (I) or an iodine compound, wherein the iodine compound comprises iodine (I) and an element selected from the group consisting of fluoride (F), chloride (Cl), bromide (Br), and combinations comprising at least one of the foregoing, detecting photons with a photon detector, wherein the photon detector produces an electrical current, and producing information based on the electrical current.

These and other advantages and features will be more readily understood from the following detailed description of preferred embodiments of the invention that is provided in connection with the accompanying drawings.

BRIEF DESCRIPTION OF THE DRAWINGS

Refer now to the figures, which are exemplary embodiments, and wherein the like elements are numbered alike.

DETAILED DESCRIPTION

Scintillating materials are disclosed herein that exhibit high efficiency and high energy resolution compared to scintillators only substituted with chlorides or bromides. To be more specific, scintillators comprising the generic formula $A_2LnBX_6$ that employ a trivalent cerium ($Ce^{3-}$) and iodide ions ($I^-$), are disclosed herein. In this formula, A can be a thallium (Tl), a Group IA element, and combinations comprising at least one of the foregoing; Ln is cerium (Ce) and, optionally, lanthanum (La), yttrium (Y), gadolinium (Gd), lutetium (Lu), praseodymium (Pr), bismuth (Bi; e.g., $Bi^{3+}$), and combinations comprising at least one of the foregoing; B can be a Group IA element, and combinations comprising at least one of the foregoing (e.g., optionally the same element(s) as "A"); and, X is iodide (I) or an iodine compound, wherein the iodide compound comprises iodide (I) and an element selected from the group consisting of, fluoride (F), chloride (Cl), bromide (Br), and combinations comprising at least one of the foregoing. More specifically, A can be Cs, K, and combinations comprising at least one of the foregoing; Ln can be Ce, and optionally, La, Gd, Lu, Bi, Y, and combinations comprising at least one of the foregoing; B can be lithium (Li), sodium (Na), and combinations comprising at least one of the foregoing; and X comprises iodine (I) or an iodine compound, wherein the iodine compound comprises iodine (I) and an element selected from the group consisting of fluoride (F), chloride (Cl), bromide (Br), and combinations comprising at least one of the foregoing. In other words, Ln can be partially or wholly substituted with cerium, i.e., if wholly substituted, Ln is cerium, if partially substituted, Ln is cerium and an element(s) including La, Y, Gd, Lu, Pr, Bi, or combinations comprising at least one of the foregoing.

Depending on the choice of the anion (X), the material crystallizes either in the elpasolite, $K_2PtX_6$, or its own unique structure. These compositions have higher light yield (LY) relative to compositions based on Cl and Br without the I. For example, compositions with the general formulation, $A_2BCeX_6$ (e.g., fully substituted Ce) are useful, with compositions with the general formulation $A_2BCeX_{6-x}I_x$ found to be more efficient under X-ray and UV excitation.

Figure 1:
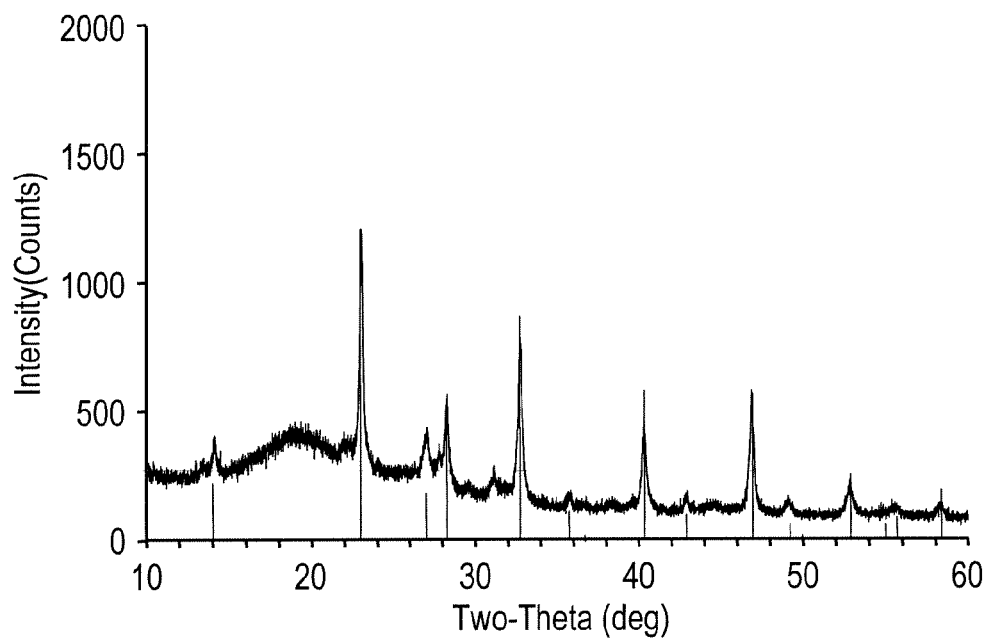
FIG. 1 is an exemplary X-ray diffraction pattern of $Cs_2CeNaCl_5I$.
Figure 2:
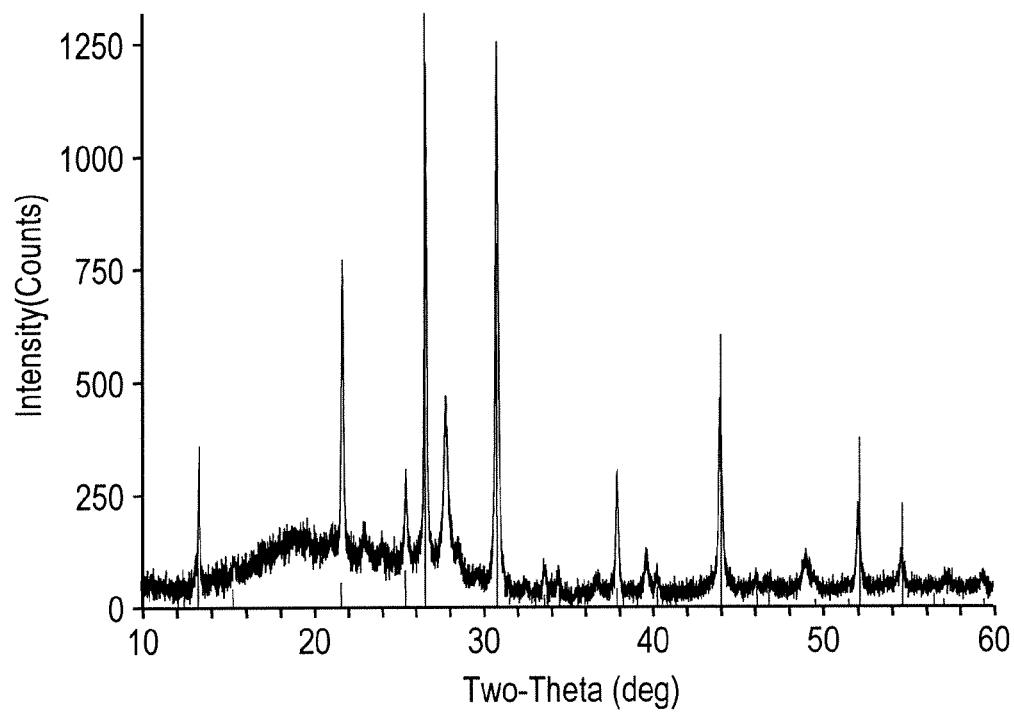
FIG. 2 is an exemplary X-ray diffraction pattern of $Cs_2CeNaCl_3I_3$.
Figure 3:
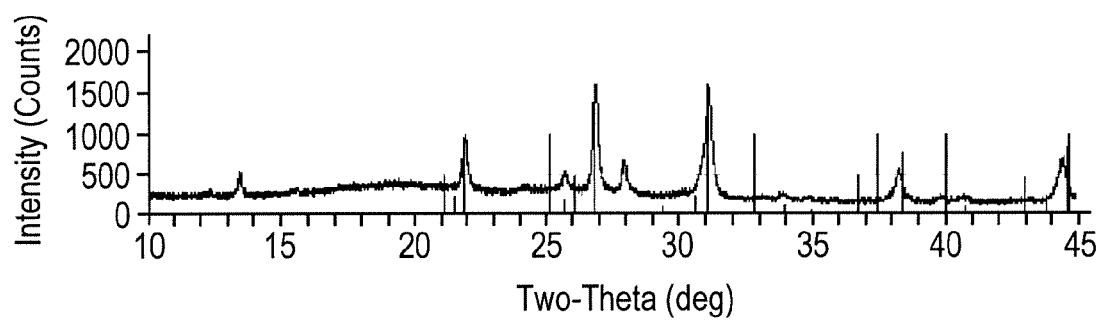
FIG. 3 is an exemplary X-ray diffraction pattern of $Cs_2CeNaBr_5I$.

The crystal structure of the scintillators disclosed herein can exist in various forms. To be more specific, the degree at which an elpasolite is substituted with the $I^-$ anion will affect the crystal structure formed. This can be expressed using the formula $A_2LnBX_{6-x}I_x$ (e.g., $Cs_2CeNaCl_{6-x}I_x$), wherein an elpasolite structure is exhibited when X=0 or 1, however when X=2 the crystal structure orients to that of $K_2PtCl_6$. This is exhibited in the X-ray diffraction patterns for compounds formulated having halides comprising Cl and I. Shown in FIG. 1 an exemplary X-ray diffraction pattern for the elpasolite crystal structure of $Cs_2CeNaCl_5I$ is compared to peak reference indicators of the known peaks exhibited by a cubic elpasolite structure, which are shown as the vertical lines. Upon evaluation it is apparent that the signature exhibited by the $Cs_2CeNaCl_5I$ crystal structure is a cubic elpasolite structure. Further, referring now to FIG. 2, an exemplary X-ray diffraction pattern for the crystal structure of $Cs_2CeNaCl_3I_3$ is compared to the peak reference indicators of a $K_2PtCl_6$ crystal structure. Upon evaluation, it is apparent the crystal structure of the $Cs_2CeNaCl_3I_3$ crystal structure is a $K_2PtCl_6$ crystal structure. Additionally, in FIG. 3, an exemplary X-ray diffraction pattern of $Cs_2CeNaBr_5I$ is compared to peak reference indicators of the known peaks exhibited by a cubic elpasolite structure, which are shown as the vertical lines. Upon evaluation it is apparent that the signature exhibited by the $Cs_2CeNaBr_5I$ crystal structure is an elpasolite crystal structure.

Figure 4:
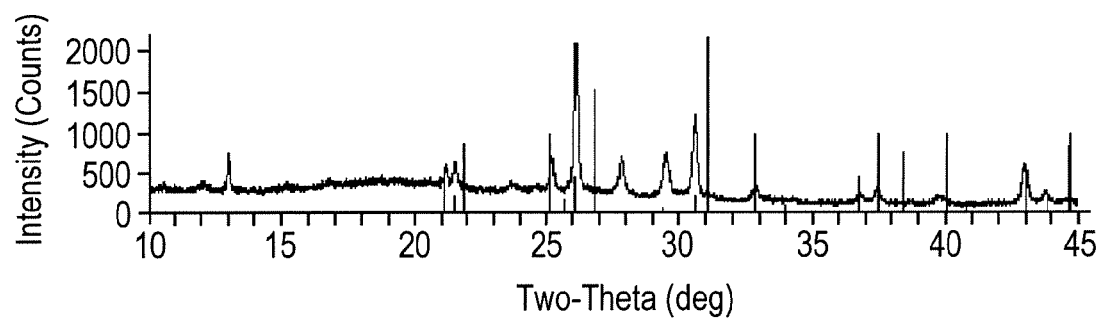
FIG. 4 is an exemplary X-ray diffraction pattern of $Cs_2CeNaBr_3I_3$.

Surprisingly, the substitution of iodine into the formula can produce a different crystal structure (i.e., different than the $K_2PtCl_6$ and elpasolite crystal structures). This was shown where X also included Cl and when it included Br. Referring now to FIG. 4, an exemplary X-ray diffraction pattern of $Cs_2CeNaBr_3I_3$ is compared to the peak reference indicators of a $K_2PtCl_6$ crystal structure. Upon evaluation, it is apparent the crystal structure of the $Cs_2CeNaBr_3I_3$ crystal structure exhibits a simple tetragonal crystalline structure. For example, a crystalline structure having a base length (a) equal to about 8.275 Å and a height (c) equal to about 12.15 Å.

Figure 5:
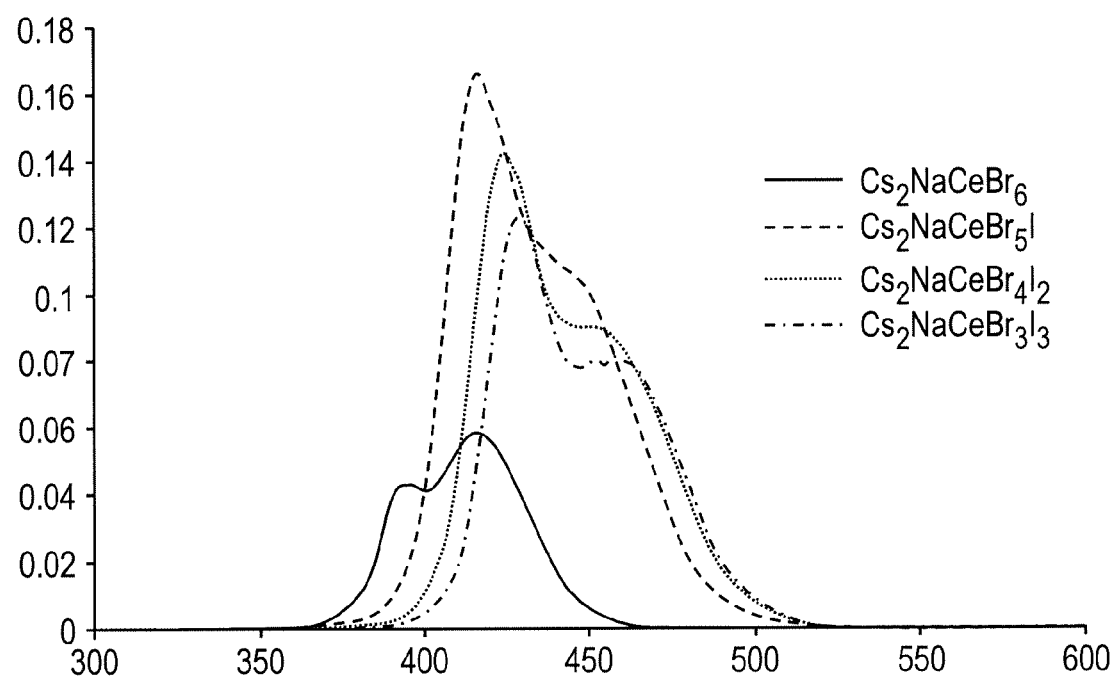
FIG. 5 is an exemplary luminescence spectra, which plots wavelength (in nanometers (nm)) to luminescence intensity (in relative intensity).

The scintillators disclosed exhibit high efficiency and high energy resolution compared to scintillators purely substituted with chlorides or bromides. For example, refer now to FIG. 5, wherein a luminescence spectra, which plots the wavelength (in nanometers (nm)) to luminescence intensity (in relative intensity). As can be seen, $Cs_2CeNaBr_6$ produces a peak light output (LO) of about 0.058 at a wavelength of about 415 nm. However, $Cs_2CeNaBr_5I$ exhibits a peak LO of about 0.165 at a wavelength of about 420 nm, $Cs_2CeNaBr_4I_2$ exhibits a peak LO of about 0.143 at a wavelength of about 425 nm, and $Cs_2CeNaBr_3I_3$ exhibits a peak light output of about 0.123 at a wavelength of about 430 nm. Thus, comparing the $Cs_2CeNaBr_6$ to the iodine substituted scintillators, the iodine substituted scintillators exhibit greater than a 100% increase in light output. In particular $Cs_2CeNaBr_5I$ exhibits greater than a 150% increase in light output compared to $Cs_2CeNaBr_6$. In other words, with the iodine substituted scintillator, a relative intensity of greater than or equal to about 0.100, or, more specifically, greater than or equal to about 0.125, or, even more specifically, greater than or equal to about 0.150, can be attained.

From this data, the scintillators disclosed herein are expected to yield greater than about 2 times the light yield, or more specifically, about 3 times the light yield of a BGO scintillator. Further, the scintillators disclosed are expected to exhibit a decay time that is 20-30 ns, wherein BGO scintillators exhibit a decay time of 300 ns.

Another feature of iodine substituted scintillators is their improved stopping power compared to $Cs_2CeNaBr_6$ or $Cs_2CeNaCl_6$ scintillators. The stopping power of a scintillator can be expressed as it's average atomic number, or $Z_{eff}$ value, which is calculated by taking the fractional proportions of each of the atoms that make up the compound and multiplying that number by the atomic number of the atom. The higher the $Z_{eff}$ value, the higher the stopping power of the scintillator. For example, the $Z_{eff}$ value, for $Cs_2CeNaBr_6$ and $Cs_2CeNaCl_6$ are 47.8 and 49.2, respectively, whereas the $Z_{eff}$ of $Cs_2CeNaI_3Br_6$ and $Cs_2CeNaI_3Cl_3$ are 52.0 and 52.9, respectively. Further, element having higher atomic numbers (e.g., Tl and/or Bi) can be added to iodine substituted scintillators to provide improved light output and greater stopping power. In such compounds, several advantages can be realized as a result of this property. For example, these scintillating crystals having greater stopping power than scintillators such as BGO, and can therefore be manufactured with a reduced thickness to achieve the same stopping power as a BGO scintillating crystal. This in turn can allow for a decrease the size of the devices in which they are employed (e.g., handheld gamma detectors) and can reduce overall crystal cost due to the usage of less crystal material.

The scintillators can be prepared in various forms, such as a single crystal (e.g., monocrystalline form), a powder, or a polycrystalline ceramic. A crystal prepared from the scintillator materials can be especially useful in high energy detectors, such as gamma ray detectors and in medical imaging equipment such as CT (computer tomography) and PET (Positron Emission Tomography) imagers.

The scintillators can be fabricated using several methods, such as sintering, sintering with gas hot isostatic pressing (GHIP), and hot pressing. The specific process employed will depend upon the specific properties desired and the final form desired. In general however, the process employed should be capable of minimizing impurities, parasite phases, light scattering and/or absorbing centers, and so forth. Some exemplary techniques for preparing scintillating materials are described in U.S. Pat. No. 5,213,712 (Dole), U.S. Pat. No. 5,882,547 (Lynch et al), and U.S. Pat. No. 6,585,913 (Lyons et al), which are incorporated herein by reference.

In one exemplary sintering process, a powder composition is first prepared having the desired composition of powder constituents (e.g., salts, oxides, halides, oxalates, carbonates, nitrates, and so forth). The powders employed desirably comprise purities of greater than or equal to about 95%, or more specifically greater than or equal to about 99% and comprise particles having micron or submicron particle sizes. In addition to the constituent powders, additives can be added to the composition, such as activators, modifiers, and the like. The composition can then be mixed (e.g., wet or dry) and/or milled (e.g., ball milled) to break up agglomerates, homogenize the composition, and optionally reduce particle size, and/or modify the particle size distribution (e.g., increase size uniformity and/or decrease average particle size). The powders are then calcined in a controlled atmosphere having less than about 100 ppm oxygen and less than about 5 ppm moisture at a temperature that is sufficient to form crystallized powder (e.g., about 800° C. for about 8 hours).

Methods for preparing single crystal materials, such as crystal-growing techniques (e.g., the Bridgman-Stockbarger method, the Czochralski method, or the zone-melting method (or "floating zone" method)) and temperature gradient methods are well known in the art. Such methods are described in U.S. Pat. No. 6,437,336 (Pauwels et al), which is incorporated herein by reference. These methods can be employed to form single crystal materials by melting the appropriate reactants at a temperature sufficient to form a congruent, molten composition (e.g., about 650° C. to about 1,100° C.), and then forming the single crystal, such as in a die-forming process. Those skilled in the art are familiar with the necessary details regarding these processes.

In one embodiment, an exemplary powder composition employed to form $Cs_2CeNaBr_5I$ comprises 0.5439 gram CsI, 0.2154 grams NaBr, 0.7952 grams $CeBr_3$ and 0.4455 grams CsBr. The halide materials are blended under an inert atmosphere, sealed in a silver tube and fired at 800 C° for 8 hours in nitrogen.

Embodiments of the present scintillating materials can be useful in the detection of radiation, such as those emitted by a radioactive source. Some exemplary references teaching detectors are U.S. Pat. Nos. 6,585,913 and 6,437,336 mentioned above, and U.S. Pat. No. 6,624,420 (Chai et al), which is also incorporated herein by reference. In general, a scintillator crystals disposed in these devices receives radiation from a source being investigated and produces photons that are characteristic of the radiation. The photons produced by the scintillator are then detected with a photodetector, such as a photomultiplier tube, photodiode, charge coupled device (CCD) sensor, and/or image intensifier, and so forth. The photodetector then produces an electrical signal that can provide information to the user. For example, the electrical signal can be received by a circuit (e.g., a controller, a computer, a data acquisition system, and so forth) and converted to a relative measure of the radiation source.

In one embodiment the scintillators disclosed can be employed in high-energy radiation detectors, such as gamma-ray detectors used for the detection of nuclear materials or even dirty bombs. In such applications, these scintillating materials can enable an increase in the detector's resolution and sensitivity compared to that provide by $Cs_2CeNaBr_6$ or $Cs_2CeNaCl_6$ scintillators due to their improved light output. To be more specific, seeing as the iodine substituted scintillators exhibit greater light output with respect to the amount of energy absorbed, variations in the intensity of the gamma radiation will result in a greater effect on the overall light output of the scintillator. Therefore, when the light output of the scintillator is amplified for measurement, such as through a photomultiplier tube, the output will have greater range, which increases the resolution of the detector. For example, an exemplary gamma detector can comprise a crystal scintillator having the formula $A_2LnBX_6$ as described above, a photodetector connected in operational communication to the crystal scintillator, wherein the photodetector is capable of producing an electrical signal upon scintillation of the scintillator, and a circuit connected in electrical communication with the photodetector, wherein the circuit is capable of receiving the electrical signal and providing a user with information.

In another embodiment the scintillators disclosed can be employed in radiation detectors for well-logging devices. For example, a scintillator and photodetector can be mounted within a radiation detector that can be advanced into a drill hole. The radiation detector can thereafter provide electrical communication to circuitry (e.g., computer) that is capable of digitizing the an area around the drill hole. Using this general process, the rock strata surrounding the drill hole can be evaluated. The technology for operably connecting the radiation detector to a well-logging tube is well known in the art, as described in U.S. Pat. No. 5,869,836 (Linden et al), which is incorporated herein by reference.

In yet another embodiment, the scintillators disclosed can be useful in radiation detectors employed in medical imaging equipment, such as computed tomography (CT) and positron emission tomography (PET) imaging equipment. In PET applications, a radiopharmaceutical agent is usually injected into a patient, which becomes concentrated within an organ of interest. Radionuclides from the compound decay and emit positrons. When the positrons encounter electrons, they are annihilated and converted into photons, or gamma rays. In a PET scanner, the device can locate these "annihilations" in three dimensions, and thereby reconstruct the shape of the organ of interest for observation. The detector modules in the scanner usually include a number of "detector blocks", along with the associated circuitry. Each detector block may contain an array of the scintillator crystals, in a specified arrangement, along with photomultiplier tubes. The general concepts are described in many references, such as U.S. Pat. No. 6,624,422 (Williams et al), which is incorporated herein by reference.

In yet another embodiment, a scintillator can be disposed on and/or within imaging equipment, e.g., pixilated flat panel devices. Moreover, the scintillator may serve as a component of a screen scintillator. For example, powdered scintillator material could be formed into a relatively flat plate that is attached to a film, e.g., photographic film. High energy radiation, e.g., X-rays, originating from some source, would contact the scintillator and be converted into light photons, which are developed on the film.

The scintillating materials disclosed exhibit high efficiency (light output), energy resolution, and stopping power, compared to other scintillators. These materials address the unmet need as a result of these properties. Furthermore, unexpectedly, scintillators based upon the formula $A_2LnBX_{6-x}I_x$, where x is greater than or equal to 3, produce a different crystalline structure than where x is less than 3. Where x is less than 3, the crsytalline structure is based upon a cubic structure (e.g., an elpasolite-type structure), while where x is greater than or equal to 3, the crsytalline structure is based upon a tetragonal structure.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity). As used herein "Group IA" refers to the groups of the Periodic Table of Elements unless specifically specified otherwise. The suffix "(s)" as used herein is intended to include both the singular and the plural of the term that it modifies, thereby including one or more of that term (e.g., the colorant(s) includes one or more colorants). Furthermore, as used herein, "combination" is inclusive of blends, mixtures, alloys, reaction products, and the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A scintillator, comprising:
a composition having a formula $A_2LnBX_6$, wherein;
    A comprises thallium (Tl), a Group IA element, and combinations comprising at least one of the foregoing;
    Ln comprises cerium (Ce) at a level greater than 0.2;
    B comprises a Group IA element; and,
    X comprises a halide compound, wherein the halide compound comprises two or more from the group consisting of iodine (I), fluoride (F), chloride (Cl), and bromide (Br).

2. The scintillator of claim 1, wherein A is selected from the group consisting of Cs, K, and combinations comprising at least one of the foregoing;
    Ln further comprises a second element selected from the group consisting of La, Gd, Lu, Bi, Y, and combinations comprising at least one of the foregoing second elements; and,
    B is selected from the group consisting of Li, Na, and combinations comprising at least one of the foregoing.

3. The scintillator of claim 1, wherein A comprises Cs, B comprises Na, and X comprises Br and I.

4. The scintillator of claim 3, wherein X is $Br_4I_2$.

5. The scintillator of claim 3, wherein X is $Br_3I_3$.

6. The scintillator of claim 1, wherein A comprises Cs, B comprises Na, and X comprises Cl and I.

7. The scintillator of claim 6, wherein X is $Cl_5I$.

8. The scintillator of claim 6, wherein X is $Cl_3I_3$.

9. The scintillator of claim 1, wherein Ln further comprises a second element selected from the group consisting of La, Y, Gd, Lu, Pr, Ce, Bi, and combinations comprising at least one of the foregoing.

10. The scintillator of claim 1, further comprising a tetragonal crystalline structure.

11. The scintillator of claim 1, wherein A comprises a different Group IA element than B.

12. A scintillator, comprising:
a composition having a formula $A_2LnBX_6$, wherein;
    A comprises Tl, a Group IA element, and combinations comprising at least one of the foregoing;
    Ln is Ce at a level greater than 0.2;
    B comprises a Group IA element, and combinations comprising at least one of the foregoing, and wherein the B is different than the A; and,
    X comprises a halide compound, wherein the halide compound comprises two or more from the group consisting of iodine (I), fluoride (F) chloride (Cl), and bromide (Br).

13. A radiation detector comprising:
a crystal scintillator having a formula of $A_2LnBX_6$, wherein;
    A comprises thallium (Tl), a Group IA element, and combinations comprising at least one of the foregoing;
    Ln comprises cerium at a level greater than 0.2;
    B comprises a Group IA element;
    X comprises a halide compound, wherein the halide compound comprises two or more from the group consisting of iodine (I), fluoride (F), chloride (Cl), and bromide (Br); and, a photodetector connected in operational communication to the crystal scintillator, wherein the photodetector is capable of producing an electrical signal upon scintillation of the scintillator.

14. The radiation detector of claim 13, wherein the photodetector is at least one device selected from the group consisting of a photomultiplier tube, a photodiode, a charge coupled device sensor, and an image intensifier.

15. The radiation detector of claim 13, wherein the photodetector is operably connected to a well-logging tool.

16. The radiation detector of claim 13, wherein the photodetector is operably connected to a positron emission tomography (PET) device.

17. The radiation detector of claim 13, wherein the photodetector is operably connected to a computed tomography (CT) device.

18. The radiation detector of claim 13, wherein the photodetector is operably connected to a digital imaging device.

19. The radiation detector of claim 13, wherein the photodetector is operably connected to a screen scintillator.

20. A method for detecting radiation with a radiation detector, comprising:

disposing a scintillator crystal having a structure formula of $A_2LnBX_6$ to a radiation source causing the scintillator crystal to emit photons, wherein;

A comprises thallium (Tl), a Group IA element, and combinations comprising at least one of the foregoing;

Ln comprises cerium at a level greater than 0.2;

B comprises a Group IA element;

X comprises a halide compound, wherein the ie-dThe halide compound comprises two or more from the group consisting of iodine (I), fluoride (F), chloride (Cl), and bromide (Br);

detecting photons with a photon detector, wherein the photon detector produces an electrical current; and, producing information based on the electrical current.

* * * * *

UNITED STATES PATENT AND TRADEMARK OFFICE
CERTIFICATE OF CORRECTION

| | | |
|---|---|---|
| PATENT NO. | : 7,368,719 B2 | Page 1 of 1 |
| APPLICATION NO. | : 11/427191 | |
| DATED | : May 6, 2008 | |
| INVENTOR(S) | : Alok Mani Srivastava et al. | |

It is certified that error appears in the above-identified patent and that said Letters Patent is hereby corrected as shown below:

STATEMENT OF FEDERALLY FUNDED RESEARCH, column 1, remove text from lines 8-12 and replace with --This invention was made with Government support under grant number N66001-05-D6012, task #1, awarded by the Homeland Security Advanced Research Projects Agency, and The Space and Naval Warfare Systems Center, San Diego. The Government has certain rights in the invention.--;

In claim 20, line 11, remove "ie-dThe".

Signed and Sealed this

Twenty-sixth Day of August, 2008

JON W. DUDAS
*Director of the United States Patent and Trademark Office*